Nov. 22, 1966  H. P. TAYLOR  3,287,646
SIGNAL-TO-NOISE RATIO METER
Filed Oct. 28, 1963  2 Sheets-Sheet 1

INVENTOR.
HUGH P. TAYLOR
BY Ernest J. Weinberger
Max H. Parmer
ATTORNEYS

Nov. 22, 1966      H. P. TAYLOR      3,287,646
SIGNAL-TO-NOISE RATIO METER
Filed Oct. 28, 1963      2 Sheets-Sheet 2

DISCRIMINATOR CHARACTERISTICS

INVENTOR.
HUGH P. TAYLOR
BY Ernest J. Weinberger
Max K. Farmer
ATTORNEYS

United States Patent Office 3,287,646
Patented Nov. 22, 1966

3,287,646
SIGNAL-TO-NOISE RATIO METER
Hugh P. Taylor, Cochituate, Mass., assignor, by mesne assignments, to the United States of America as represented by the Secretary of the Navy
Filed Oct. 28, 1963, Ser. No. 319,620
5 Claims. (Cl. 325—363)

This invention, in general, relates to noise measurement and more particularly to a meter for a direct measurement of the signal to noise ratio of a modulated continuous wave signal having imposed thereon a noise level.

Heretofore in the measurement of signal-to-noise of a modulated carrier wave, it has been customary to use a two step procedure. This procedure involves the measurement of voltage under two conditions noise plus signal and either noise or signal alone. Ordinarily the elimination of one factor or the other leads to erroneous results especially when the signal and noise levels are of the same order of magnitude. Additionally, human mathematical calculations are necessary, which, in themselves, are subject to error and are time consuming.

Pursuant to the present invention, these problems have been overcome and an apparatus and method have been devised for the measurement of signal to noise ratio which may be performed without altering any operation of the equipment, or requiring sets of separate measurements, and which ratio may be read directly from a single meter. It is accordingly an object of this invention to provide a simple, rapid, inexpensive, reliable, easily operable instrument for the direct measurement of signal to noise ratio.

Another object is to provide a method for the rapid and efficient measurement of signal to noise ratio.

Other objects and advantages will appear from the following description of an example of the invention, and the novel features will be particularly pointed out in the appended claims.

Figure 1:
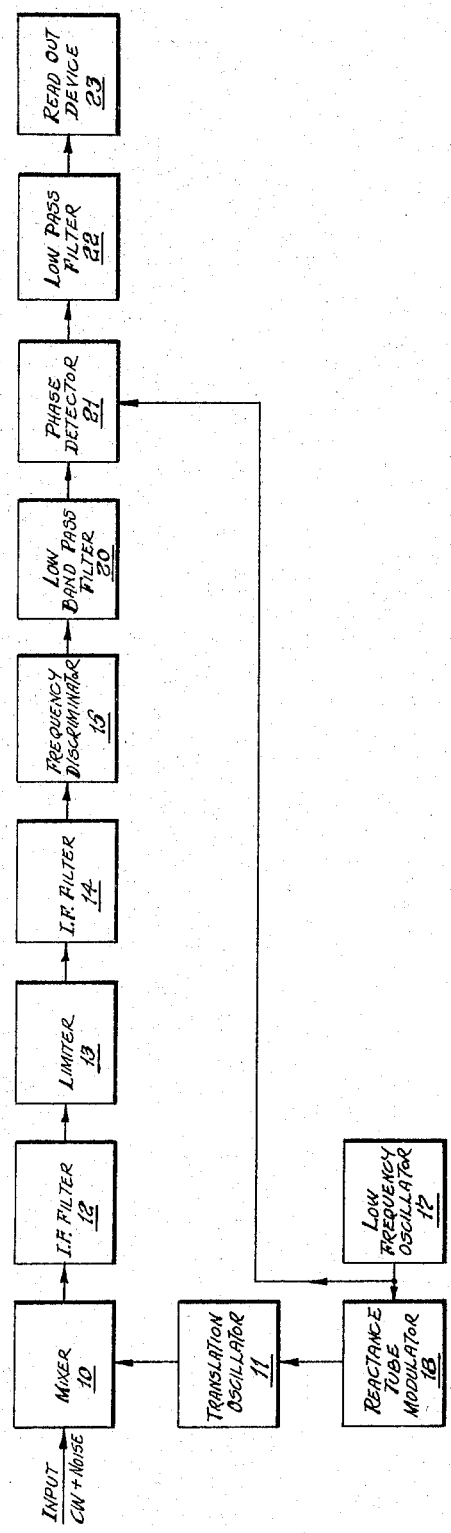
FIG. 1 is a block diagram of a signal-to-noise ratio meter constructed in accordance with the present invention.

In the illustrated embodiment of FIG. 1, an incoming modulated continuous wave signal voltage having a noise component or background is applied to one input of mixer 10. This noise for ease of comprehension may be assumed to be white with a Gaussian amplitude and phase distribution. Translation or local oscillator 11, which can be frequency variable, feeds the other input of mixer 10 wherein are generated at least the sum and difference frequencies. The oscillator 11 is adjusted so as to produce an output at the mixer within the gate bandwidth region of the first intermediate frequency filter 12. This first filter in effect determines the frequency bandwidth of interest and further acts to eliminate all the higher order of harmonics introduced by the translation and mixing action. In order to dispense with any amplitude effects and to set the voltage amplitude limit supplied to the following stages, a voltage amplitude limiter 13 is provided and applies hard limiting so that essentially a constant amplitude signal can be considered as existing at the output of the limiter. A second I.F. filter network 14 serves to remove the higher frequency noise components which were introduced by the limiting of the preceding stage.

Figure 2:
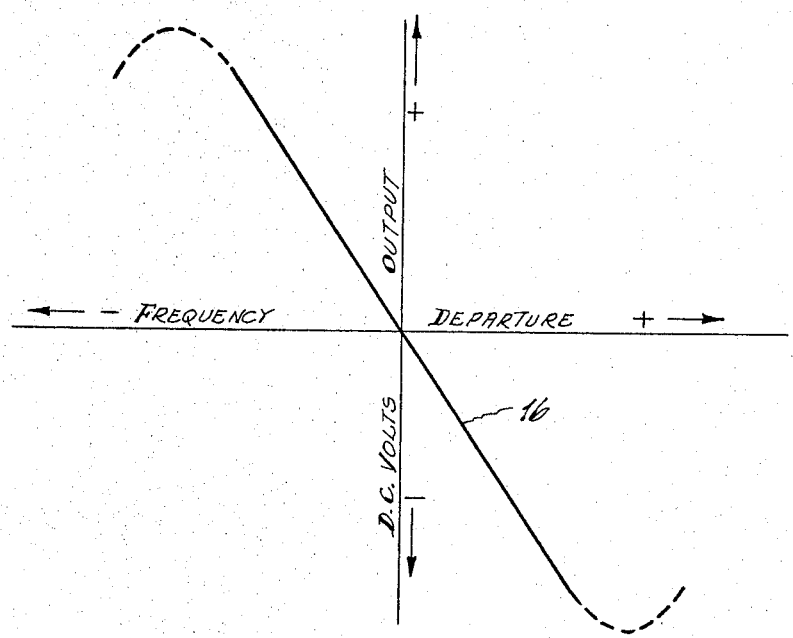
FIG. 2 is a curve indicating typical frequency discriminator characteristics.

The filter 14 output is applied to a typical conventional frequency discriminator 15 whose frequency vs. output characteristic is illustrated in FIG. 2. When the input frequency is equal to the center frequency $f_c$ of the discriminator or there is no input signal, the discriminator output is zero. At frequencies above and below the center frequency the output voltage will vary appropriately above and below the mean value. The polarity of the output voltage in addition to its amplitude is dependent on the input frequency deviation from $f_c$ and where only the linear portion of curve 16 is employed this relationship is proportional. Discriminators in general are conventional circuits and are readily available for purchase as individual circuits or, if desired, can be designed with reference to many pertinent publications. If the center frequency $(f_c)$ of the discriminator is made to coincide with the center of the bandpass of the filter then, in effect, the discriminator continually compares one-half the I.F. pass-band to the other half. When only noise is present at the discriminator, the R.M.S. voltage level will be the same in both halves of the pass-band and the noise probability density function at the discriminator output can be assumed to be Gaussian with a zero mean value. In other words, the noise exists over the entire bandpass region and that portion on one side produces a positive potential equal to the negative potential produced by the other portion with a net output of zero. If, however, C.W. is present which may fluctuate as to amplitude and frequency, its frequency spectrum will be much narrower than the discriminator bandwidth and therefore can only appear in one-half passband or the other, at any one time except, of course, for the center or cross-over frequency $(f_c)$. The D.C. voltage output of the discriminator for a given input will be:

$$E_o = a_1 S + \frac{N}{2} - a_2 S - \frac{N}{2} = a_1 S \left(1 - \frac{a_2}{a_1}\right) \quad (1)$$

where $S$ = signal voltage,
$N$ = noise voltage,
$a$ = attenuation constant determining that portion of the input signal that will appear in the second or negative half of the discriminator passband and is proportional to the displacement of the signal frequency from the center frequency.

Since the voltage amplitude input to the discriminator is fixed by the limiter 13, it may be considered as:

$$E_i = 1 = S + N \quad (2)$$

where S and N are the voltages at the limiter output. By dividing the output (1) by the input (2) we obtain the transfer characteristic, which is:

$$\frac{E_o}{E_i} = \frac{a_1\left(1 - \frac{a_2}{a_1}\right)}{S+N} = \frac{KS}{S+N}$$

where $$K = a_1\left(1 - \frac{a_2}{a_1}\right)$$

and is the discriminator frequency variable gain characteristic and may further be defined:

$$K = \frac{\omega}{W/2}$$

and has a maximum value of unity where,

ω = frequency off the discriminator center minus the center frequency, and
W/2 = one-half the discriminator passband or the frequency deviation for maximum gain.

Up to the present the signal or input at the discriminator has been considered relatively frequency fixed except for the noise component. By providing a low frequency oscillator 17 which feeds a conventional reactance tube modulator 18 or any such suitable modulator, the output of the translation oscillator 11 will shift frequency in synchronization with the low frequency oscillator 17.

By introducing this F.M. deviation on the translation oscillator by means of a reactance tube modulator at a rate determined by the low frequency oscillator, the signal at the discriminator will appear as an F.M. on the translated I.F. signal which will now be continually changing back and forth between the two halves of the discriminator passband and an output signal will be obtained from the discriminator at a frequency equal to the F.M. rate, and an amplitude proportional to the deviation and the discriminator transfer function.

The discriminator output is then further filtered by the low frequency bandpass filter 20 centered at the modulation frequency which follows the discriminator. The resulting signal is then detected and converted to D.C. by the phase detector 21. The reference signal for the phase detector is obtained from the low frequency oscillator 17. Further post-detection filtering is done after conversion to D.C. by low pass filter 22, to smooth out the remaining noise fluctuations so that a relatively constant reading may be obtained on a read-out device 23 which will be anything from a recording voltmeter to an oscilloscope. The amount of post-detection filtering will be determined by the minimum signal-to-noise ratio that it is desired to read.

The voltmeter or readout device 23 can now be calibrated to read directly in signal-to-noise ratio referenced to the I.F. gate bandwidth. This can be seen from the following considerations.

The signal output to the phase detector will be determined by $E_o^1$ = discriminator gain × F.M. deviation × limiter output.
Or $$E_o^1 = \frac{kSD}{S+N}(S+N)$$

normalizing to the limited output voltage $$\frac{E_o^1}{S+N} = \frac{kSD}{S+N}$$

and as $S+N=1$ $$k=1 \text{ for } \omega=W/2$$

$D=\pm W/2$ for maximum output $$E_o^1 = \pm \frac{S}{S+N}$$

the plus and minus signs indicating excursions above and below the discriminator center frequency.

The D.C. output of the phase detector will therefore be proportional to $$\frac{S}{S+N}$$

and for large signal-to-noise ratios $S \gg N$ $$S+N=S$$

and $$\frac{S}{S+N}=1$$

For small signal-to-noise ratios $(S+N=N)$ and the output is given by $E_o=S/N$ which is proportional to the signal-to-noise ratio in the I.F. passband. The actual meter calibration curves have been evaluated and signal-to-noise ratios up to +3 reliably measured.

It should be noted that the use of an envelope detector after the low frequency bandpass filter would also work; but a fixed displacement error would exist because of the D.C. noise component introduced by the rectification action.

Summarizing, by way of method, this invention contemplates the measurement of signal-to-noise by:

(1) Mixing the incoming signal having noise included therewith with a different frequency oscillation (mixer 10, translation oscillator 11),
(2) Varying said different frequency in a sinusoidal manner (modulator 18 and oscillator 17),
(3) Filtering the output of the mixing (filter 12) about an intermediate frequency,
(4) Limiting the resulting voltage amplitude (limiter 13),
(5) Filtering (filter 14),
(6) Frequency discrimination about the intermediate frequency (discriminator 15),
(7) Filtering to pass only the lower frequency components (filter 20),
(8) Phase detecting and referencing with respect to said different frequency (phase detector 21).
(9) Filtering out any A.C. components (low pass filter 22), and finally
(10) Recording or reading out the voltage amplitude of the resulting signal which is indicative of the $S/N$ ratio of the original incoming signal.

It will be understood that various changes in the details, materials and arrangements of parts (and steps), which have been herein described and illustrated in order to explain the nature of the invention, may be made by those skilled in the art within the principle and scope of the invention as expressed in the appended claims.

I claim:
1. A signal-to-noise ratio meter for determining said ratio of a continuous wave signal having noise included therewith which comprises:
  (a) a translation oscillator,
  (b) means for sinusoidally frequency sweeping said translation oscillator,
  (c) a mixer having a pair of inputs and an output, said translation oscillator connected to one of said inputs and
  (d) means coupling said continuous wave signal and noise into said other mixer input,
  (e) voltage amplitude limiter having its input connected to said mixer output,
  (f) frequency discrimination means connected to receive the output of said limiter means,
  (g) a phase detector having a pair of inputs and an output, for comparing the phases of signals introduced at said inputs and producing an output having an amplitude proportional thereto,
  (h) a source of a sinusoidal signal inphase and synchronized with the sweep of said means for sweeping said translation oscillator,
  (i) said source connected to one input of said detector and the output of said discriminator connected to the other of said detector inputs,
  (j) a read-out device for indicating the voltage amplitude at the input of said device,
  (k) whereby when the output of said detector is applied to said read-out device the amplitude indication thereof will be proportional to the signal-to-noise ratio of said continuous wave signal.

2. The meter according to claim 1, further including a pair of low pass filters, one interposed between said mixer and said limiter, the other interposed between said limiter and said discrimination means.

3. The meter according to claim 2, further including a bandpass filter interposed between said discrimination means and said phase detector.

4. The meter according to claim 3, wherein said source is a second oscillator.

5. The meter according to claim 4, wherein said means for sinusoidal frequency sweeping includes a reactance tube modulator connected with and controlled by said second oscillator for sinusoidally varying the same.

References Cited by the Examiner

UNITED STATES PATENTS

| 2,499,995 | 3/1950 | Heller | 324—79 X |
| 2,678,383 | 5/1954 | Frantz | 325—363 |
| 2,889,516 | 6/1959 | Staschover | 325—363 X |
| 3,101,446 | 8/1963 | Glomb et al. | 325—363 X |

DAVID G. REDINBAUGH, *Primary Examiner.*

JOHN W. CALDWELL, *Examiner.*